(12) United States Patent
Buck

(10) Patent No.: US 9,424,409 B2
(45) Date of Patent: Aug. 23, 2016

(54) METHOD AND SYSTEM FOR PROTECTING PRIVACY AND ENHANCING SECURITY ON AN ELECTRONIC DEVICE

(71) Applicant: Lookout, Inc., San Francisco, CA (US)

(72) Inventor: Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 197 days.

(21) Appl. No.: 13/738,850

(22) Filed: Jan. 10, 2013

(65) Prior Publication Data

US 2014/0196158 A1 Jul. 10, 2014

(51) Int. Cl.
*G06F 21/00* (2013.01)
*G06F 21/31* (2013.01)
*G06F 21/60* (2013.01)

(52) U.S. Cl.
CPC ............ *G06F 21/31* (2013.01); *G06F 21/60* (2013.01); *G06F 2221/031* (2013.01); *G06F 2221/2141* (2013.01)

(58) Field of Classification Search
CPC . G06F 21/60; G06F 21/31; G06F 2221/2141; G06F 2221/031
USPC .................................... 726/30; 713/178, 186
See application file for complete search history.

(56) References Cited

U.S. PATENT DOCUMENTS

| | | | |
|---|---|---|---|
| 3,416,032 A | 12/1968 | Jahns et al. | |
| 4,553,257 A | 11/1985 | Mori et al. | |
| 5,319,776 A | 6/1994 | Hile et al. | |
| 5,574,775 A | 11/1996 | Miller, II et al. | |
| 5,715,518 A | 2/1998 | Barrere et al. | |
| 6,185,689 B1 | 2/2001 | Todd et al. | |
| 6,269,456 B1 | 7/2001 | Hodges et al. | |
| 6,272,353 B1 | 8/2001 | Dicker et al. | |
| 6,301,668 B1 | 10/2001 | Gleichauf et al. | |
| 6,453,345 B2 | 9/2002 | Trcka et al. | |
| 6,529,143 B2 | 3/2003 | Mikkola et al. | |
| 6,696,941 B2 | 2/2004 | Baker | |
| 6,792,543 B2 | 9/2004 | Pak et al. | |

(Continued)

FOREIGN PATENT DOCUMENTS

GB 2430588 3/2007
WO WO2005101789 10/2005

(Continued)

OTHER PUBLICATIONS

Owusu, Emmanuel, et al., "Password Inference using Accelerometers on Smartphones", HotMobile '12, Feb. 28, 2012.

(Continued)

*Primary Examiner* — Mohammad A Siddiqi
(74) *Attorney, Agent, or Firm* — Dergosits & Noah LLP

(57) ABSTRACT

A method for protecting privacy and enhancing security on an electronic device is provided. When sensor information associated with at least one user input action is collected by a sensor in an electronic device hosting a plurality of applications, the method includes intercepting a request to access the sensor information from a requesting application of the plurality of applications, and controlling access to the sensor information associated with the at least one user input action based on the requesting application. By controlling access to the sensor information, leakage of sensitive or secure information to a malicious background application is minimized and privacy and security are enhanced.

22 Claims, 2 Drawing Sheets

(56) References Cited

U.S. PATENT DOCUMENTS

| | | |
|---|---|---|
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,036 B2 | 1/2007 | Hinchliffe et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,526,297 B1 | 4/2009 | Holur et al. |
| 7,539,882 B2 | 5/2009 | Jessup et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,809,936 B2 | 10/2010 | Einloth et al. |
| 7,813,745 B2 | 10/2010 | Li |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,099,764 B2 | 1/2012 | Herzog et al. |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,158 B2 | 2/2012 | Jessup et al. |
| 8,127,358 B1 | 2/2012 | Lee |
| 8,135,395 B2 | 3/2012 | Cassett et al. |
| 8,195,196 B2 | 6/2012 | Haran et al. |
| 8,214,910 B1 | 7/2012 | Gossweiler et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,447,856 B2 | 5/2013 | Drako |
| 8,463,915 B1 | 6/2013 | Kim |
| 8,484,332 B2 | 7/2013 | Bush et al. |
| 8,504,775 B2 | 8/2013 | Plamondon |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken |
| 2003/0120951 A1 | 6/2003 | Gartside et al. |
| 2003/0131148 A1 | 7/2003 | Kelley et al. |
| 2004/0022258 A1 | 2/2004 | Tsukada et al. |
| 2004/0025042 A1 | 2/2004 | Kouznetsov et al. |
| 2004/0058644 A1 | 3/2004 | Saigo et al. |
| 2004/0133624 A1 | 7/2004 | Park |
| 2004/0158741 A1 | 8/2004 | Schneider |
| 2004/0185900 A1 | 9/2004 | McElveen |
| 2004/0199665 A1 | 10/2004 | Omar et al. |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |

(56) References Cited

U.S. PATENT DOCUMENTS

| | | |
|---|---|---|
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0174515 A1* | 7/2007 | Sinclair et al. .................. 710/62 |
| 2007/0186282 A1 | 8/2007 | Jenkins |
| 2007/0190995 A1 | 8/2007 | Wang et al. |
| 2007/0214245 A1 | 9/2007 | Hamalainen et al. |
| 2007/0214504 A1 | 9/2007 | Milani Comparetti et al. |
| 2007/0220608 A1 | 9/2007 | Lahti et al. |
| 2007/0240217 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0155268 A1* | 6/2008 | Jazayeri et al. ................ 713/186 |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0215970 A1* | 9/2008 | Tsuji et al. ..................... 715/702 |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0070283 A1 | 3/2009 | Kang et al. |
| 2009/0134968 A1* | 5/2009 | Girgensohn et al. ........... 340/3.1 |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0292487 A1 | 11/2009 | Duncan et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0088398 A1 | 4/2010 | Plamondon |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0138501 A1 | 6/2010 | Clinton et al. |
| 2010/0154032 A1 | 6/2010 | Ollmann |
| 2010/0173658 A1 | 7/2010 | Fan et al. |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0167024 A1* | 7/2011 | Maldonado Diaz et al. ... 706/10 |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0069361 A1* | 3/2012 | Abelow ..................... 348/14.01 |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0086606 A1* | 4/2012 | Mathews et al. ............... 342/461 |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0136924 A1* | 5/2012 | Tomida ........................ 709/203 |
| 2012/0159636 A1 | 6/2012 | Pandya et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0215938 A1 | 8/2012 | Fletcher et al. |
| 2012/0221317 A1* | 8/2012 | Hwang ........................ 703/23 |
| 2012/0233695 A1 | 9/2012 | Mahaffey et al. |
| 2012/0246499 A1 | 9/2012 | Jessup et al. |
| 2012/0259954 A1 | 10/2012 | McCarthy et al. |
| 2012/0278467 A1 | 11/2012 | Schneider |
| 2012/0303735 A1 | 11/2012 | Raciborski et al. |
| 2012/0310391 A1* | 12/2012 | Sanders ........................ 700/94 |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0063550 A1* | 3/2013 | Ritchey et al. ................. 348/36 |
| 2013/0111597 A1 | 5/2013 | Gossweiler et al. |
| 2014/0059703 A1* | 2/2014 | Hung et al. ..................... 726/28 |

FOREIGN PATENT DOCUMENTS

| | | |
|---|---|---|
| WO | WO2006110181 | 10/2006 |
| WO | WO2007081356 | 7/2007 |

(56) References Cited

FOREIGN PATENT DOCUMENTS

| WO | WO2008007111 | 1/2008 |
|----|--------------|--------|
| WO | WO2008057737 | 5/2008 |
| WO | WO2010048218 | 4/2010 |
| WO | WO2010048220 | 4/2010 |
| WO | WO2012027588 | 1/2012 |

OTHER PUBLICATIONS

"DeviceOrientation Event Specification", W3C, available at http://dev.w3.org/geo/api/spec-source-orientation, retrieved on Feb. 28, 2013, published on Jun. 13, 2012.

Cai, Liang et al., "On the Practicality of Motion Based Keystroke Inference Attack", Trust and Trustworthy Computing Lecture Notes in Computer Science vol. 7344, 2012, pp. 273-290, Jun. 13, 2012.

Xu, Zhi et al., "TapLogger: Inferring User Inputs on Smartphone Touchscreens Using On-board Motion Sensors", WISEC '12 Proceedings of the fifth ACM conference on Security and Privacy in Wireless and Mobile Networks pp. 113-124, Apr. 16, 2012.

Miluzzo, Emiliano et al., "TapPrints: Your Finger Taps Have Fingerprints", MobiSys '12 Proceedings of the 10th international conference on Mobile systems, applications, and services, pp. 323-336, Jun. 25, 2012.

Cai, Liang et al., "TouchLogger: Inferring Keystrokes on Touch Screen From Smartphone Motion", HotSec'11 Proceedings of the 6th USENIX conference on Hot topics in security pp. 9-9.

\* cited by examiner

METHOD AND SYSTEM FOR PROTECTING PRIVACY AND ENHANCING SECURITY ON AN ELECTRONIC DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments relate generally to handheld electronic devices, and more specifically to systems and methods for protecting a user's privacy and enhancing security on an electronic device, such as a mobile communication device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Mobile electronic communication devices have evolved beyond simple telephones and are now highly complex multifunctional devices with capabilities rivaling, and in some cases surpassing, those of desktop or laptop computers. In addition to voice communications, many mobile communication devices are capable of capturing images, text messaging, e-mail communications, internet access, social networking, and running full-featured application software. A full range of mobile applications are available from online application stores that can be downloaded onto mobile communication devices. These applications can be games and/or services that provide additional capabilities, such as online banking, stock trading, payments, and other financial activities. Furthermore, mobile communication devices can store confidential or private information such as access codes, passwords, account numbers, e-mail addresses, personal communications, phone numbers, and financial information.

With so many functions and services and with the ability to store sensitive and confidential information, mobile communication devices are a prime target for cybercriminals who create malicious applications, which when loaded onto a device are designed to gain access to information stored on the device or to disrupt the operation of the device. Indeed, the number of identified malicious applications targeting mobile devices increased six fold in one year over the previous year. Some malicious applications are designed to run silently in the background without the user's knowledge. These applications can eavesdrop on the user's input actions and/or on incoming or outgoing messages, and can then forward this information to another device or destination.

In some instances, a malicious application can be configured to eavesdrop on information collected by one or more sensors in the communication device, and to use that information to infer a password or other sensitive information. For example, many mobile communication devices include inertial motion sensors, e.g., an accelerometer and a gyroscope, that collect information relating to the spatial movement and orientation of the device. Access to this motion information by an application on the device is typically unfettered. While seemingly harmless, it has been shown that sensor information collected by an accelerometer and/or a gyroscope when a user is typing on an on-screen keyboard provided by the device can be used to infer the keystrokes associated with the typing. This information leak can help a cybercriminal to decipher the user's password or other confidential information. In a different example, there is an increasing trend towards the use of sensors in or connected to a communications device to monitor health or medical conditions. Access to this information by an application on the device can raise privacy concerns.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
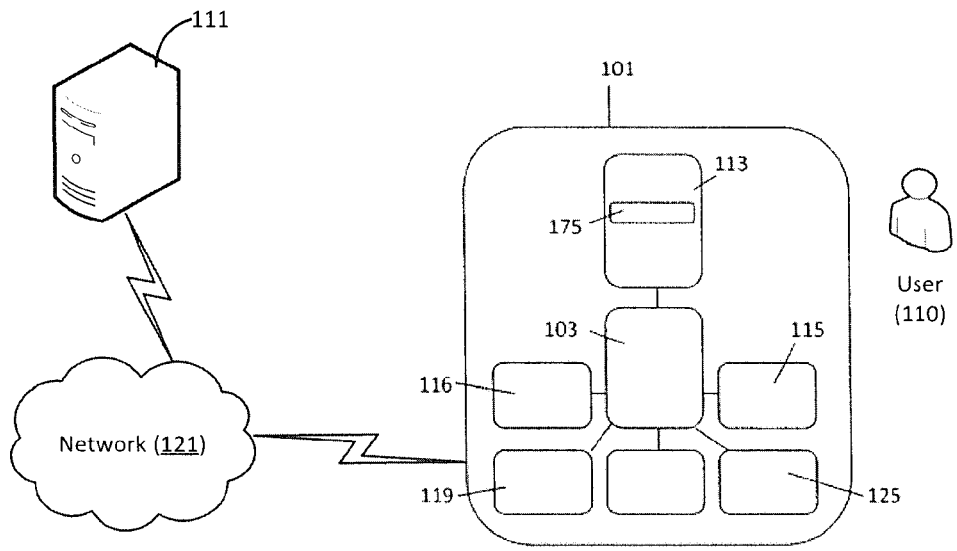
FIG. 1 is a block diagram illustrating an electronic device according to an embodiment.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are provided for protecting a user's privacy on a mobile communication device that hosts applications and includes a plurality of sensors. In an embodiment, the inventive systems and methods manage the sensor information collected by the device's sensors and determine which applications, if any, are authorized to access certain types of sensor information. As noted above, sensor information associated with at least one user input action can be collected by a sensor in the mobile communication device, and an application hosted by the device can request access to the sensor information from the sensor. In some cases, such requests are automatically granted because the sensor is not configured to validate requests, and can result in the release of sensitive information. According to an embodiment, the request for access is intercepted, and access to the sensor information is controlled based on the requesting application. Thus, the user's privacy on the device is protected by controlling access to the sensor information associated with the user's input actions.

As used herein, the term "mobile communication device" refers to mobile phones, tablets, PDAs and smartphones. The term "mobile communications device" also refers to a class of laptop computers which run an operating system that is also used on mobile phones, tablets, PDAs, or smartphones. Such laptop computers are often designed to operate with a continuous connection to a cellular network or to the internet via a wireless link. Specifically, mobile communication devices include devices for which wireless communication services such as voice, messaging, data, or other wireless Internet capabilities are a primary function. As used herein, a "mobile communication device" may also be referred to as an "electronic device," an "electronic client device," "mobile device," "mobile client," or "handset." However, a person having skill in the art will appreciate that while the present invention is disclosed herein as being used on mobile communication devices, the present invention may also be used on other computing platforms, including desktop, laptop, notebook, netbook, or server computers.

Prior to describing the subject matter in detail, an exemplary mobile communication device in which the subject matter may be implemented shall first be described. Those of ordinary skill in the art will appreciate that the elements illustrated in FIG. 1 may vary depending on the system implementation. With reference to FIG. 1, a block diagram of an embodiment of the mobile communication device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: Bluetooth, local area networks such as WiFi, and cellular networks such as GSM, CDMA or LTE.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 may operate in a networked environment using logical connections to one or more remote nodes 111 via a communication interface. The remote node may be another computer, a server, a router, a peer device or other common network node, and typically includes many or all of the elements described above relative to the mobile device 101. The communication interface may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

It should be understood that the arrangement of mobile communication device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
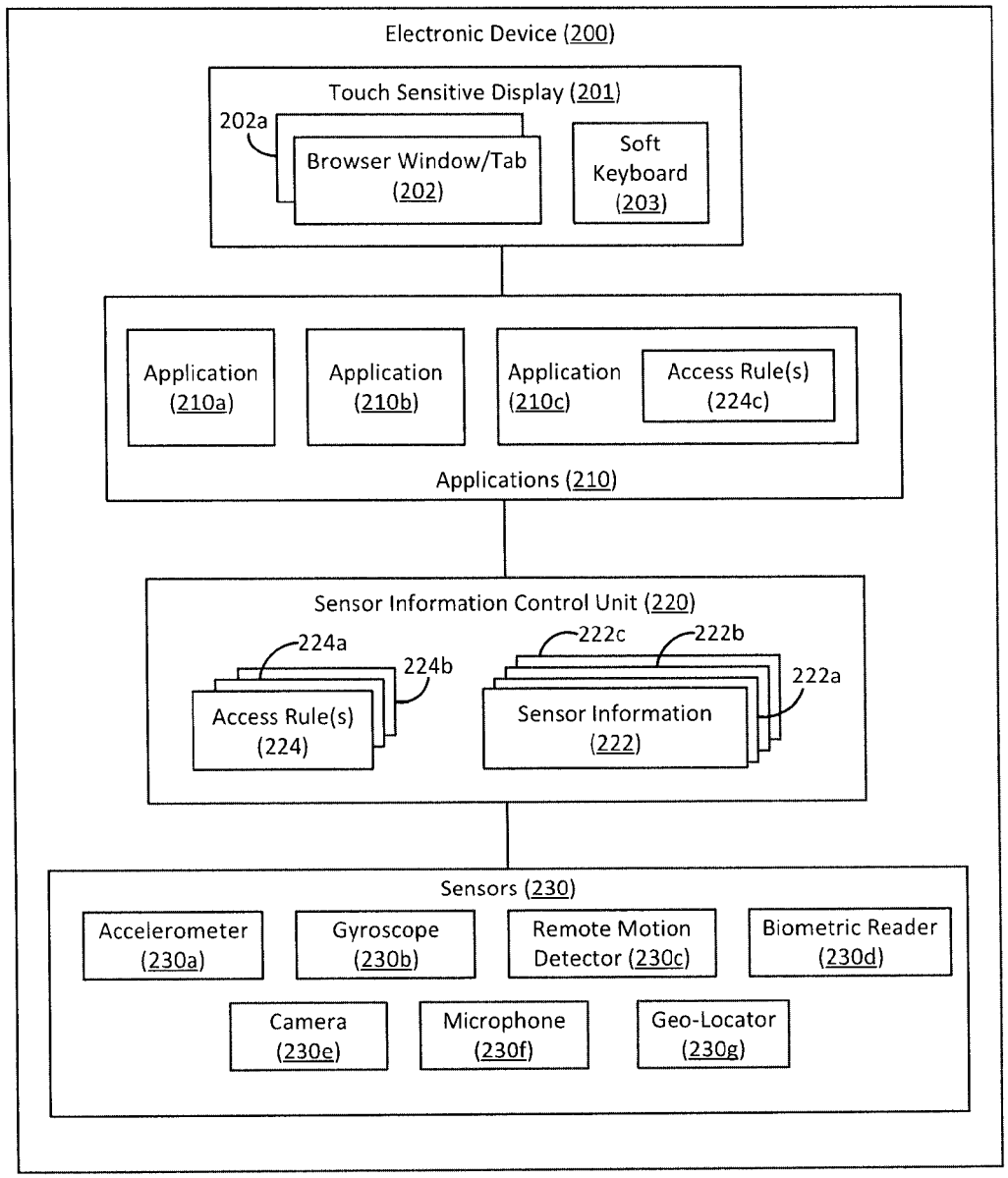
FIG. 2 is a block diagram illustrating an electronic device according to another embodiment.

FIG. 2 is a more detailed block diagram of a mobile communication device 200 having components, and/or their analogs, that are configured to protect a user's privacy according to an embodiment. As is shown in FIG. 2, the mobile communication device 200 can include a display 201, a processor, a plurality of applications 210, memory, and a plurality of sensors 230. In an embodiment, the display 201 can be configured to present visual content to a user 110 of the communication device 200 via a browser window and/or a browser tab 202 associated with an application 210. Alternatively or in addition, the display 201 can present a soft keyboard 203. In an embodiment, the display 201 can be a touch sensitive component that is configured to receive input information from a user 110 when the user 110 touches a portion of the displayed window/tab 202 and/or the soft keyboard 203.

As is shown in FIG. 2, the sensors 230 can include, an accelerometer 230a, a gyroscope 230b, a remote motion detector 230c, a biometric reader 230d, a camera 230e, a microphone 230f, a geo-locator 230g, e.g., a Global Positioning System (GPS), and other sensors 230. In an embodiment, each sensor 230 can collect sensor information 222 specific to its sensor type. For example, the accelerometer 230a and the gyroscope 230b can be configured to collect inertial motion information, e.g., linear acceleration and angular rotation, of the communication device 200, and the remote motion detector 230c can be configured to collect sensor information relating to the user's 110 physical gestures. The biometric reader 230d can collect biometric information of the user 110 such as fingerprint and/or retina information. According to an embodiment, some sensors 230 can continuously collect sensor information 222, which can be provided, upon request, to an application 210 for further processing. Alternatively, other sensors 230 can be invoked on an as-needed basis to collect sensor information 222. For example, the biometric reader 230d can be invoked to collect the finger print information of the user 110 during an authentication process. It should be understood that the sensors 230 can include sensors that reside within the mobile communication device 200 or which reside outside the device but are connected to it by a wired or wireless connection.

According to an embodiment, the mobile communication device 200 be configured to provide an execution environment configured to support operation of a Sensor Information Control Unit 220. The Sensor Information Control Unit 220 can be configured, in an embodiment, to manage the sensor information 222 collected by each of the sensors 230. For example, when the accelerometer 230a collects acceleration sensor information 222a and the gyroscope 230b collects rotational sensor information 222b, the Sensor Information Control Unit 220 can receive and store the sensor information 222b, 222c and can determine which application 210, if any, is authorized to have access to the sensor information 222b, 222c. For example, the Sensor Information Control Unit 220 can determine that a game application 210a is authorized to access the sensor information 222b, 222c but that a mapping application 210b is not authorized.

Figure 3:
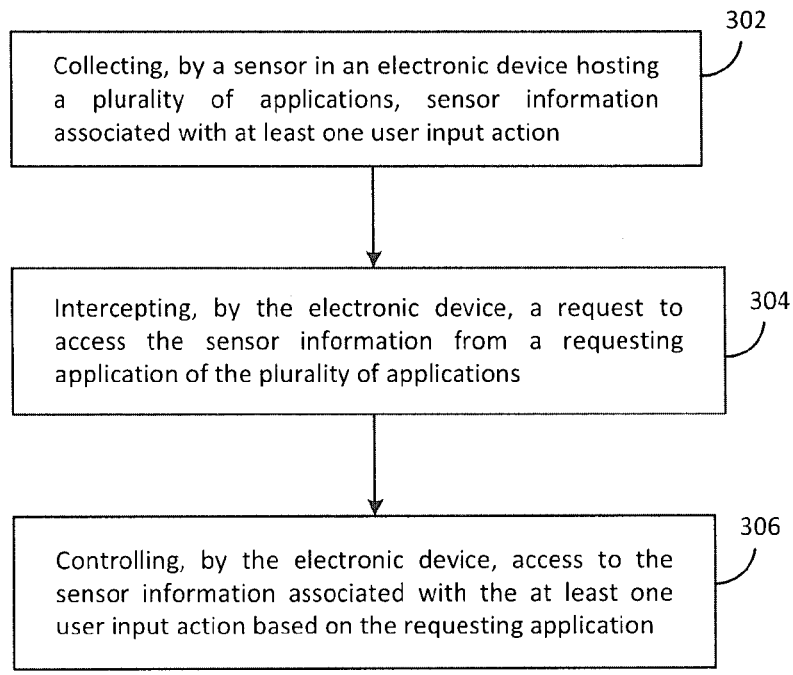
FIG. 3 is an operational flow diagram illustrating a high level overview of a method for protecting a user's privacy on an electronic device according to an embodiment.

FIG. 3 is a flow diagram illustrating a method for protecting a user's privacy on an electronic device according to an embodiment. The method illustrated in FIG. 3 can be carried out by, for example, at least some of the components in the example electronic device illustrated in FIG. 1 and FIG. 2, but can also be carried out in environments other than those illustrated in FIG. 1 and FIG. 2. According to an embodiment, the method 300 begins, in block 302, when sensor information 222 associated with at least one user input action is collected by a sensor 230 in an electronic device 200 hosting a plurality of applications 210. For example, the accelerometer 230a and/or the gyroscope 230b can collect inertial motion sensor information 222a associated with the user 110 touching the touch sensitive display 201, or the microphone 230f can collect audio information 222b associated with the user 110 providing a voice command. Alternatively or in addition, the biometric reader 230d can collect biometric sensor information associated with the user 110 providing a fingerprint, or the remote motion detector 230c can collect motion sensor information 222c associated with the user 110 performing a gesture.

According to an embodiment, the sensor information 222 collected by the sensor(s) 230 can be transmitted to the Sensor Information Control Unit 220 for storage. As noted above, the Sensor Information Control Unit 220 can be configured to intercept a request from a requesting application, e.g., 210b, to access the sensor information 222 associated with the user input action and collected from at least one sensor 230 in block 304. In an embodiment, the request can identify the requesting application 210b and the sensor, e.g., the accelerometer 230a, from which the desired sensor information 222a is collected. In response to receiving the request, the Sensor Information Control Unit 220 can be configured to control access to the desired sensor information 222a based on the requesting application 210b in block 306.

In an embodiment, the Sensor Information Control Unit 220 can be configured to receive one or more sets of sensor information access rules 224 that define access control policies associated with sensor information 222 collected by the sensor(s) 230, and to control access to the sensor information 222 based on the sets of sensor information access rules 224. In some embodiments, a set of access rules 224c can be provided by an application 210c that defines which type(s) of sensor information 222 the application 210c needs in order to provide its functionality when the application 210c is running in the foreground, i.e., when it is a foreground application. In addition, such a set of access rules 224c can include a rule that restricts access by a background application, e.g., 210b, to sensor information 222 collected by specified sensors, e.g., the remote motion detector 230c and the microphone 230f, when the application 210a is running in the foreground. Alternatively or in addition, a rule provided by the foreground application 210c can restrict access by background applications 210b to sensor information 222 during a specific stage or phase during which the foreground application 210c is receiving user input actions corresponding to sensitive or secure information, and can allow access by the background application(s) 210b otherwise.

In other embodiments, the user 110 and/or an administrator of the device 200 can provide a set of access rules 224b that define global access control policies. For example, such a global set of rules 224b can include a rule that grants access to sensor information collected by the biometric reader 230d by only a foreground application. Thus, a first application 210a can be authorized to access biometric sensor information 222 but can be denied full access to such information when it is running in the background, i.e., when it is a background application. In another embodiment, the global set of rules 224b can include another rule that provides access to the requested sensor information 222 when the first application 210a is a foreground application that requests the user input action. In this case, a browser window/tab 202 and/or soft keyboard 203 associated with the first application 210a can be displayed by the touch sensitive display 201, and the user input action can be an input in the window/tab 202 and/or a keystroke corresponding to at least one key on the soft keyboard 203. The requested sensor information 222 can be collected from the accelerometer 230a, the gyroscope 230b, and/or the biometric reader 230c1.

In another embodiment, more than one browser window or tab 202 can be displayed. For example, the touch sensitive display 201 can provide a first window/tab 202 associated with a first browser application 210a that is a foreground application and a second window/tab 202a associated with a second browser application 210b. In this case, the first window/tab 202 is in the foreground, i.e., is a foreground window, and the second window/tab 202a is not. When the user input action is received in the first browser window/tab 202 and both the first 210*a* and second 210*b* browser applications request sensor information 222, the global set of rules 224*b* can include another rule that grants access by the first application 210*a* and restricts access by the second application 210*b* to the requested sensor information 222.

According to another embodiment, a set of access rules 224*a* can be provided by at least one of the sensors 230 to define access policies for the sensor information 222 collected by the sensor(s) 230. For example, in an embodiment, the electronic device 200 can be placed on a surface next to another device, such as a laptop computer, and the accelerometer 230*a* in the electronic device 200 can eavesdrop on keystrokes of the other device by collecting accelerometer sensor information 222*a* associated with user input action on the other device. In this case where the electronic device 200 is used to invade the privacy of another user of another device, an access rule 224*a* provided by the accelerometer 230*a* in the electronic device 200 can restrict access to the accelerometer sensor information 222*a* by any application 210 when the accelerometer sensor information 222*a* indicates that the electronic device 200 has been placed on a stationary surface. Conversely, when the accelerometer sensor information 222*a* indicates that the electronic device 200 has been removed from the stationary surface, the access rule 224*a* can be terminated. Accordingly, the sensor 230 can control the circumstances under which another application 210 has access to the sensor information 222 collected by the sensor 230.

When the Sensor Information Control Unit 220 determines to restrict access by a requesting application 210*b* to sensor information 222, for example, because the requesting application 210*b* is a background application and the sensor information is associated with user input actions, the Sensor Information Control Unit 220 can block all access by the requesting application 210*b* to the sensor information 222 and return no information in response to the request. Alternatively or in addition, the Sensor Information Control Unit 220 can return partial or modified sensor information that cannot be used to infer the user's input action. For example, random noise can be added to the sensor information 222 to obfuscate the sensor information 222, and/or the sampling frequency of the sensor 230 can be decreased to reduce the amount of sensor information 222 collected.

In another embodiment, the Sensor Information Control Unit 220 can provide alternative sensor information completely unrelated to the user input actions. In an embodiment, the collected sensor information 222 can be replaced with information corresponding to a neutral object. For example, when the sensor is the accelerometer 230*a*, the information provided in response to the request for sensor information can be information corresponding to the electronic device when it is at rest, i.e., placed on a stationary surface. In another embodiment, the accelerometer 230*a* can be configured to collect real time sensor information associated with the real time motion of the electronic device 200 and to classify this information into one of several large motion category types. For example, the accelerometer 230*a* can be trained to correlate certain patterns of sensor information to broad classifications of motion such as walking, ascending/descending stairs, bicycling, running, or resting. In this case, the Sensor Information Control Unit 220 can replace the collected sensor information 222 associated with the user input actions with preconfigured accelerometer sensor information corresponding to the motion category corresponding to the real time motion of the electronic device 200.

According to an embodiment, the Sensor Information Control Unit 220 can be configured to restrict access by a requesting application 210*b* to sensor information 222 only during a sensitive period mode when the user 110 is performing user input actions. At other times, i.e., during non-sensitive periods, the Sensor Information Control Unit 220 can be configured to provide the sensor information 222 collected by the sensors 230 to a requesting application 210 regardless of whether it is a foreground or background application. In an embodiment, the Sensor Information Control Unit 220 can be configured to determine that the electronic device 200 is in a non-sensitive period mode when a specified amount of time has passed, e.g., 60 seconds, without an input user action. In this case, when an input user action is detected, i.e., a keystroke is entered, the Sensor Information Control Unit 220 can be triggered to immediately enter the sensitive period mode.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling access to a delivery of sensor information to a requesting application running on an electronic device, the method comprising:
   collecting, by a sensor in the electronic device hosting a plurality of applications, the sensor information associated with at least one user input action;
   intercepting, by the electronic device, a request to access the sensor information from the requesting application of the plurality of applications;
   determining, by the electronic device, that the requesting application is running in one of a foreground of the electronic device and a background of the electronic device; and
   controlling, by the electronic device, access of the requesting application to the sensor information associated with the at least one user input action by applying a set of access rules including at least one rule based on the determination that the requesting application is running in the foreground of the electronic device and at least one rule based on the determination that the requesting application is running in the background of the electronic device, wherein the set of rules defines access control policies to permit or to prevent the delivery of the sensor information to the requesting application running on the electronic device, the access control policies being associated with the sensor information collected by the sensor in the electronic device.

2. The method of claim 1 wherein the sensor includes one of an accelerometer, a gyroscope, a camera, a biometric reader, a microphone, and a remote motion detector.

3. The method of claim 1 wherein the at least one user input action includes a touching a touchpad, providing a voice command, providing biometric information, and performing at least one of a gesture.

4. The method of claim 1 wherein the at least one rule based on the determination that the requesting application is running in the background of the electronic device is a rule for preventing all access by the requesting application to the sensor information.

5. The method of claim 1 wherein, based on the determination that the requesting application is running in the background of the application, preventing the delivery of the sensor information by adding a random noise to the sensor information to obfuscate the sensor information.

6. The method of claim 1 wherein, based on the determination that the requesting application is running in the background of the application, preventing the delivery of the sensor information by decreasing a sampling frequency of the sensor to reduce the sensor information.

7. The method of claim 1 wherein, based on the determination that the requesting application is running in the background of the application, preventing the delivery of the sensor information by replacing the collected sensor information with information corresponding to a neutral object.

8. The method of claim 1 wherein, when the sensor is an accelerometer, the method further comprises detecting, by the accelerometer, that the electronic device is placed on a stationary surface, and the step of preventing the requesting application from accessing the sensor information.

9. The method of claim 1 further comprising:
displaying, by the electronic device, at least one of a window and a soft keyboard associated with a first application of the plurality of applications based on the determination that the first application is running in the foreground of the electronic device;
requesting, by the first application in the electronic device, a user input action comprising at least one of an input in the window and a keystroke corresponding to at least one key on the soft keyboard displayed by the electronic device;
receiving, by the electronic device, the user input action in at least one of the window and the soft keyboard; and
providing, by the electronic device, access to the sensor information associated with the input action to the first application.

10. The method of claim 9, further comprises, if the requesting application is not authorized to access the sensor information, controlling access to the delivery of sensor information to the requesting application, wherein controlling access includes at least one of preventing all access to the sensor information, adding random noise to the sensor information to obfuscate the sensor information, and replacing the sensor information with information corresponding to a neutral object based on the determination that the requesting application is running in the background of the electronic device.

11. The method of claim 1, wherein the set of access rules further comprises at least one rule for restricting access by the requesting application to the collected sensor information during a sensitive period mode when a user is performing the at least one user input action.

12. The method of claim 11 wherein the set of access rules are provided by at least one of the user, an administrator of the electronic device, and an application of the plurality of applications hosted by the electronic device.

13. The method of claim 1 further comprising:
providing, by the electronic device, a first browser window or a first browser tab and a second browser window or a second browser tab;
receiving, by the electronic device, the at least one user input action in the first browser window/tab, wherein the first browser window/tab is running in the foreground of the electronic device;
providing, by the electronic device, access to the sensor information associated with the least one user input action to the first browser window/tab; and
restricting access to the sensor information by the second browser window/tab when the second browser window/tab is not running in the foreground of the electronic device.

14. The method of claim 1 further comprising:
collecting, by the sensor, real time sensor information associated with a real time motion of the electronic device; and
classifying, by the sensor, the real time sensor information associated with the real time motion of the electronic device into a first of a plurality of motion categories, wherein controlling access to the sensor information associated with the at least one user input action includes providing preconfigured sensor information corresponding to the first motion category.

15. A non-transitory computer-readable medium carrying one or more sequences of instructions for controlling access to the delivery of sensor information to a requesting application running on an electronic device, which instructions, when executed by one or more processors, cause the one or more processors to perform operations comprising:
collecting, by a sensor in the electronic device hosting a plurality of applications, the sensor information associated with at least one user input action;
intercepting, by the electronic device, a request to access the sensor information from the requesting application of the plurality of applications;
determining, by the electronic device, that the requesting application is running in one of a foreground of the electronic device and a background of the electronic device; and
controlling, by the electronic device, access of the requesting application to the sensor information associated with the at least one user input action by applying a set of access rules including at least one rule based on the determination that the requesting application is running in the foreground of the electronic device and at least one rule based on the determination that the requesting application is running in the background of the electronic device, wherein the set of rules defines access control policies to permit or to prevent the delivery of the sensor information to the requesting application running on the electronic device, the access control policies being associated with the sensor information collected by the sensor in the electronic device.

16. The computer-readable medium of claim 15 wherein the set of access rules includes a rule for preventing all access to the sensor information by the requesting application based on the determination that the requesting application is running in the background of the electronic device.

17. The computer-readable medium of claim 15 wherein preventing the delivery of the sensor information includes adding a random noise to the sensor information to obfuscate the sensor information based on the determination that the requesting application is running in the background of the electronic device.

18. The computer-readable medium of claim 15 wherein preventing the delivery of the sensor information includes decreasing a sampling frequency of the sensor to reduce the sensor information based on the determination that the requesting application is running in the background of the electronic device.

19. The computer-readable medium of claim 15 wherein preventing the delivery of the sensor information includes replacing the sensor information with information corresponding to a neutral object based on the determination that the requesting application is running in the background of the electronic device.

20. The computer-readable medium of claim 15 wherein the set of access rules further comprise at least one rule for restricting access by the requesting application to the collected sensor information during a sensitive period mode when a user is performing the at least one user input action.

21. The computer-readable medium of claim 15 wherein the instructions cause the one or more processors to perform further operations comprising:

providing, by the electronic device, a first browser window or a first browser tab and a second browser window or a second browser tab;

receiving, by the electronic device, the at least one user input action in the first browser window/tab, wherein the first browser window/tab is running in the foreground of the electronic device;

providing, by the electronic device, access to the sensor information associated with the least one user input action to the first browser window/tab; and restricting access to the sensor information by the second browser window/tab when the second browser window/tab is not running in the foreground of the electronic device.

22. The computer-readable medium of claim 15 wherein the instructions cause the one or more processors to perform further operations comprising:

collecting, by the sensor, real time sensor information associated with a real time motion of the electronic device; and classifying, by the sensor, the real time sensor information associated with the real time motion of the electronic device into a first of a plurality of motion categories, wherein controlling access to the sensor information associated with the at least one user input action includes providing preconfigured sensor information corresponding to the first motion category.

* * * * *